United States Patent [19]

Maldonado et al.

[11] 4,330,449
[45] May 18, 1982

[54] PROCESS FOR PREPARATION OF COMPOSITIONS OF BITUMEN POLYMERS AND PRODUCTS

[75] Inventors: Paul Maldonado, St Symphorien d'Ozon; Daniele Eber, Lyons; Trung Kiet Phung, Vienne, all of France

[73] Assignee: Elf France, Paris, France

[21] Appl. No.: 278,606

[22] Filed: Jun. 29, 1981

Related U.S. Application Data

[63] Continuation-in-part of Ser. No. 94,362, Nov. 15, 1979, abandoned.

[51] Int. Cl.³ .................................................. C08L 95/00
[52] U.S. Cl. .................................................. 524/68
[58] Field of Search ................................. 260/28.5 AS

[56] References Cited

U.S. PATENT DOCUMENTS

| | | | |
|---|---|---|---|
| 4,129,542 | 12/1978 | Matheson et al. | 260/28.5 AS |
| 4,130,516 | 12/1978 | Gagle et al. | 260/28.5 AS |
| 4,145,322 | 3/1979 | Maldonado et al. | 260/28.5 AS |
| 4,237,052 | 12/1980 | Fitoussi et al. | 260/28.5 AS |
| 4,248,749 | 2/1981 | Hayashi et al. | 260/28.5 AS |

*Primary Examiner*—Melvyn I. Marquis
*Attorney, Agent, or Firm*—Burgess, Ryan and Wayne

[57] ABSTRACT

A method of preparation of polymer-asphalt (bitumen) compositions which comprises mixing, with agitation, at a temperature of 130° to 230° C., 80 to 98% by weight of an asphalt having a penetration between 30 to 220, and 2 to 20% by weight of a polyblock copolymer of a styrene-carboxylated conjugated diene having a mean molecular weight of 30,000 to 300,000, and maintaining this mixture for at least 2 hours at this temperature, then adding 0.1 to 3% of elemental sulfur, based on the asphalt, while maintaining the same conditions of agitation and temperature for at least 20 minutes, the carboxylated conjugated diene sequence being selected from the group consisting of carboxylated polybutadiene and carboxylated polyisoprene.

4 Claims, No Drawings

PROCESS FOR PREPARATION OF COMPOSITIONS OF BITUMEN POLYMERS AND PRODUCTS

RELATED APPLICATIONS

This application is a continuation-in-part of U.S. application Ser. No. 94,362 filed Nov. 15, 1979, now abandoned.

U.S. Pat. No. 4,145,322 of Mar. 20, 1979 describes and claims a method of preparing polymer-asphalt (bitumen) compositions which consists in bringing into contact, at a temperature between 130 and 230° C., 80 to 98% by weight of an asphalt having a penetration between 30 and 220, and 2 to 20% by weight of a block copolymer of styrene and a conjugated diene, of mean molecular weight between 30,000 and 300,000, keeping the mixture obtained under agitation for at least 2 hours, then adding 0.1 to 3% by weight of elemental sulfur, based on the asphalt, and maintaining the agitation of the mixture thus obtained for at least 20 minutes in order to obtain the vulcanization in situ of the block copolymer.

The diene sequence of the di- or polyblock copolymers described in this application contains, essentially, butadiene.

It is the object of the present invention to extend the method disclosed in U.S. Pat. No. 4,145,322 to the preparation of polymer asphalts (bitumens) in which the copolymers are selected from the group consisting of styrene-carboxylated isoprene and styrene-carboxylated butadiene, the elastomeric properties and/or the phenomena of cross-linking of these products in the presence of elemental sulfur making it possible where applicable to reduce the proporation of block copolymers to be introduced into the polymer asphalt compositions of the invention.

Di-block copolymers of polystyrene-carboxylated polyisoprene or polystyrene-carboxylated polybutadiene preferably contain from 15 to 20% by weight polystyrene.

Their mean molecular weight is preferably between 70,000 and 90,000.

The proporation of carboxyl groups is low, and is preferably between 0.5 and 0.1% based on the weight of the polymer.

Their position lies, preferably, at the ends of the polydiene chains and can be acquired either by terminating the anionic polymerization reaction with $CO_2$, or by maleinization or grafting of acrylic acid to the non-carboxylated polymer.

The block copolymers of polystyrene-carboxylated isoprene and polystyrene-carboxylated polybutadiene can be prepared by methods well known in the art. In particular, the block copolymers can be prepared by the method disclosed in Block Copolymers Overview and Critical Survey, Allen Noshay and James E. McGrath, Academic Press, Inc. 1977.

Vulcanization in situ in an asphalt of a di-block copolymer of polystyrene-carboxylated polybutadiene or polystyrene-carboxylated isoprene has the advantage of giving the latter improved cold elastomeric properties, while retaining a hot viscosity for the product that is substantially idential to that of an asphalt produced from a di-block copolymer of polystyrene-polybutadiene and sulfur.

These improvements can be explained by the fact that a double-cross-linking occurs between polymer chains.

One cross-linking which is reversible, is provided by the carboxyl groups of the polymer which become salified on the metal ions present in the asphalt (fe, Ni, V) when the temperature of the mixture decreases, transforming the non-elastomeric, di-block chains into elastomeric polyblock chains.

The other cross-linking which is irreversible, is effected by the covalent sulfur bridges created between chains of polymer whose presence is maintained at an elevated temperature.

The double cross-linking, by improving the elastomeric properties of the asphalt, makes it possible, therefore, to reduce the proportion of polymers in the composition to obtain a bitumen composition with properties required to meet the specifications of the intended use, and hence to have a direct effect on the cost of the product.

The reversibility of the ionic cross-linking facilities the hot application of the product by maintaining a viscosity similar to that obtained with a di-block, non-carboxylated copolymer used in the same proportion.

The following examples, given in non-limiting fashion, will make it possible to appreciate the improvement in the properties obtained by the addition of styrene-carboxylated isoprene and styrene-carboxylated butadiene copolymers to the bitumen.

EXAMPLE I (Comparative Example)

Mix 100 parts of an 80–100 asphalt, with a Ball and Ring temperature of 48° C. and a Fraas point of −18° C., and 10 parts of a di-block isoprene-styrene copolymer having a mean molecular weight of 80,000 and an isoprene/sytrene ratio of weight equal to 3.0. Keep the mixture at 170° C. for 3 hours and 30 minutes under agitation, add 0.2 parts of elemental sulfur and continue agitating for one half hour.

The characteristics of the polymer-asphalt composition obtained are given in Table I.

EXAMPLE II (Comparative Example)

Example I is reproduced, with omission of the sulfur, and keeping the mixture under agitation for 4 hours. It is found that the composition is fragile even in traction tests at −10° C., 10 mm/min.

EXAMPLE III (Example of the Present Invention)

Proceed as in Example I, but replace, in the di-block copolymer, the isoprene moiety by a carboxylated butadiene moiety, said copolymer having 0.6% by weight carboxyl groups and a butadiene/sytrene ratio by weight of 3, which improves the elastic properties, as can be seen in Table I.

EXAMPLE IV (Comparative Example)

This is a comparative example to Example III, which it reproduces without vulcanization in situ, i.e., omitting the addition of elemental sulfur.

It is found that the fragility appears for traction tests at −10° C. 500 mm/min.

EXAMPLE V (Example of the Present Invention)

Owing to the improvement in the elastic properties brought by the carboxylated butadiene at the end of the chain, proceed as in the preceding examples, but with introduction of 3% by weight of the copolymer of Example III.

lead to particularly interesting performance, and are useful in:

the formation of road surfaces and industrial coverings (coatings, surface dressings, asphalt cappings, and the like), industrial applications such as sealing (cappings, roofing felt, shingles, paints, automobile undercoating, and heat, electrical and sound insulation products).

TABLE I

| | | | | Characteristics | | | | | | | | | | | |
|---|---|---|---|---|---|---|---|---|---|---|---|---|---|---|---|
| | | | Point | Traction Tests | | | | | | | | | | | |
| | | Test | de | +20° C. 500 mm/mn | | | | −10° C. 10 mm/mn | | | | 10° C. 500 mm/mn | | | |
| EX N° | P (1) | B + A °C. (2) | Fraas °C. | bars $\sigma_s$ | bars $\sigma_r$ | % $\epsilon_s$ | % $\epsilon_r$ | bars $\sigma_s$ | bars $\sigma_r$ | % $\epsilon_s$ | % $\epsilon_r$ | bars $\sigma_s$ | bars $\sigma_r$ | % $\epsilon_s$ | % $\epsilon_r$ |
| I | 53 | 71.5 | −31 | 2,14 | 1.17 | 100 | 625 | 8,5 | 8 | 200 | 320 | 24,6 | 22,3 | 38 | 90 |
| II | 40 | 76 | −23 | 4.93 | 2.25 | 25 | 900 | — | — | — | — | — | — | — | — |
| III | 36 | 120 | −28,5 | 2.25 | 4.25 | 200 | 900 | 10 | 22,9 | 50 | 700 | 31 | 45,5 | 125 | 540 |
| IV | 39 | 101 | −21 | 2.8 | 1.68 | 30 | 900 | 19,4 | 10,9 | 30 | 210 | — | — | — | — |
| V | 59 | 61 | −22 | 1.4 | 0.97 | 30 | 900 | 18,8 | 9,6 | 16.3 | 583 | — | — | — | — |
| VI | 60 | 57.5 | −21 | 1.44 | 0.74 | 30 | 800 | 27,5 | 9,6 | 12.5 | 200 | — | — | — | — |
| VII | 45 | 102.1 | −30 | 2,60 | 1.95 | 30 | 900 | 12 | 13.5 | | 400 | 31.2 | 29.6 | 40 | 120 |
| VIII | | 89 | | 1.98 | 2.07 | 125 | 700 | 8.78 | 12.15 | 30 | 480 | 29.2 | 26.8 | 87.8 | 325 |

(—) Fragile not measurable
(1) P = penetration
(2) B + A = Ball and Ring

EXAMPLE VI (Comparative Example)

Operate for comparison with Example V, with a proportion of 3% of a copolymer of styrene-non-carboxylated butadiene having a ratio of butadiene/styrene by weight of 3.

EXAMPLE VII (Example of the Present Invention)

Example I is reproduced except that the isoprene-styrene copolymer is replaced by a di-block copolymer of styrene-carboxylated isoprene having 0.55% by weight of carboxyl groups and an isoprene/styrene ratio by weight of 3.

EXAMPLE VIII (Comparative Example)

The method of Example III was followed except that the di-block copolymer of polystyrene-carboxylated butadiene was replaced by a di-block copolymer of polystyrene-non-carboxylated butadiene. The weight traction of butadiene/styrene of the polymer was 3.

The properties of the polymer bitumen mixture prepared in the examples are shown in Table I. The data in Table I clearly shows the superior properties of the composition of the present invention over the compositions prepared using non-carboxylated diene polymers. The superior properties are unexpected in view of the teachings of the prior art.

The products such as those obtained within the scope of the present invention are products which have a highly elastic character, a substantial range of plasticity,

We claim:

1. A method of preparing a polymer-asphalt composition which comprises forming a mixture at a temperature of 130 to 230° C., comprising 80 to 98% by weight of an asphalt having a penetration between 30 and 220, and 2 to 20% by weight of a polyblock styrene-carboxylated conjugated diene copolymer having a molecular weight between 30,000 and 300,000, maintaining the mixture for at least two hours at a temperature of 130 to 230° C., then adding to said mixture 0.1 to 3 by weight of elemental sulfur, based on the asphalt in said mixture, while agitating the mixture and maintaining the temperature of 130 to 230° C. for at least 20 minutes to form said composition, the conjugated diene block being selected from the group consisting of carboxylated butadiene and carboxylated isoprene.

2. A method according to claim 1, wherein the copolymers added to the asphalt are polystyrene-carboxylated polybutadiene copolymers having a proportion of polystyrene from about 15 to 25% by weight, a molecular weight ranging from 70,000 to 90,000 and a proportion of carboxyl groups ranging from 0.05 to 0.1% by weight based on the polymer.

3. A method according to claim 1, wherein 100 parts of 80–100 asphalt is mixed with 10 parts of a carboxylated isoprene-styrene copolymer having a mean molecular weight of 80,000 and an isoprene/styrene ratio by weight of 3.0 at about 170° C. for about 3 hours, about 0.2 parts of elemental sulfur is than added, and agitation is continued for about one half hour.

4. The produce obtained according to the method of claim 1 or 2.

* * * * *